July 29, 1941.  K. K. PROBST  2,251,167
STEERING GEAR
Filed Sept. 9, 1938   2 Sheets-Sheet 1
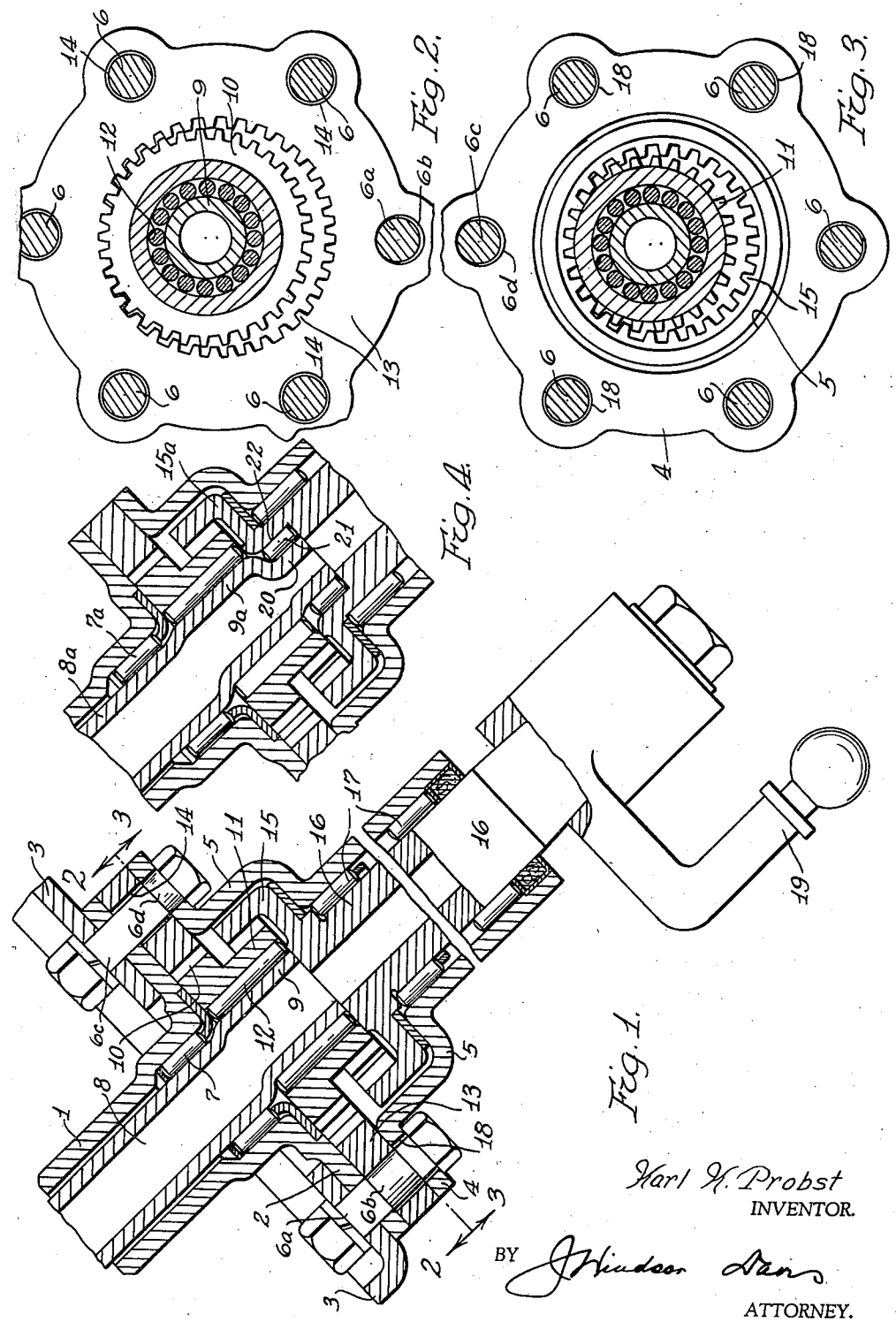
Karl K. Probst
INVENTOR.
BY J. Windsor Davis
ATTORNEY.

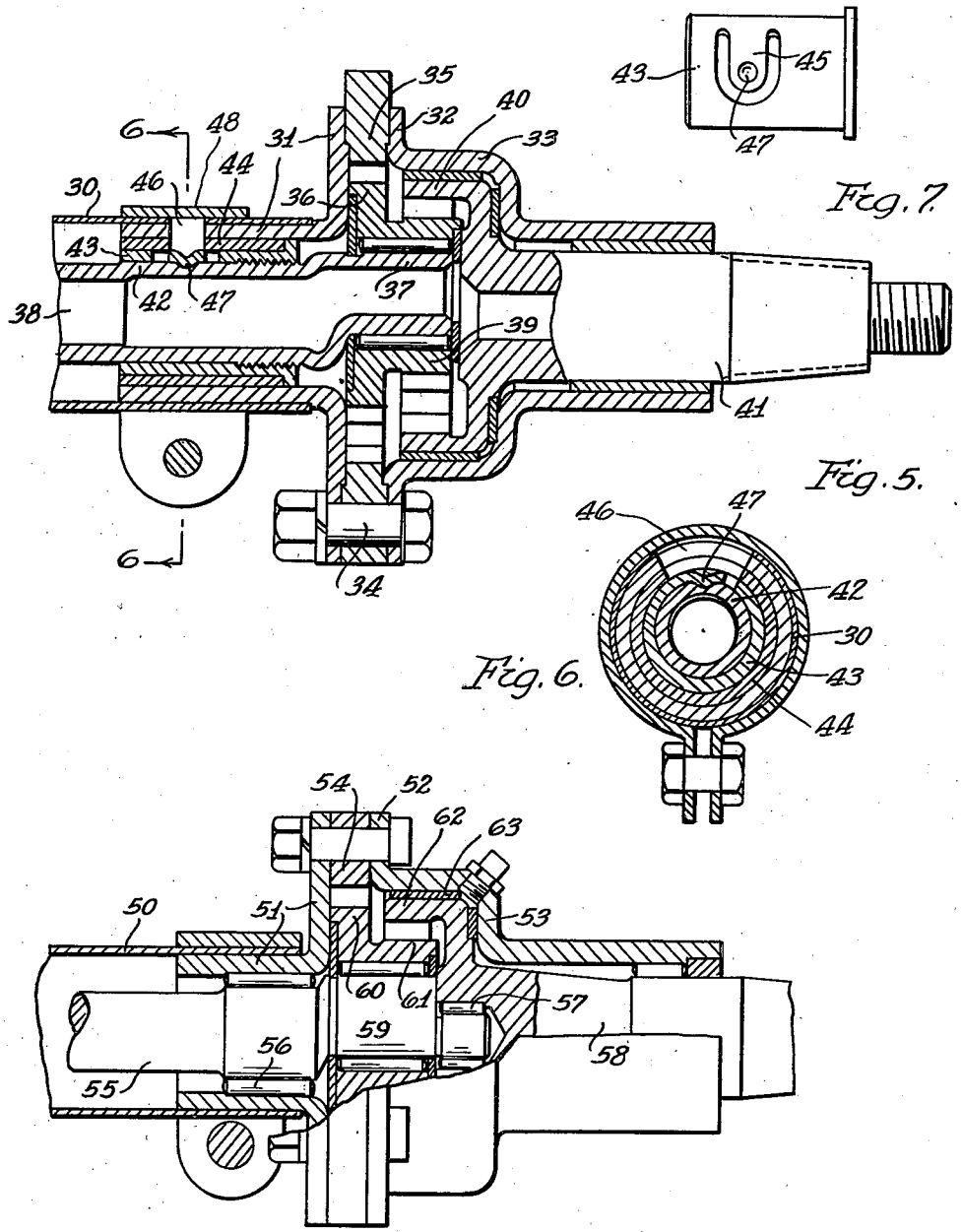

Patented July 29, 1941

2,251,167

UNITED STATES PATENT OFFICE 2,251,167

STEERING GEAR

Karl K. Probst, Detroit, Mich., assignor to Karl K. Probst and J. H. Shoemaker, as joint trustees for Probst-Shoemaker-Merrill Company, Detroit, Mich., a joint venture company Application September 9, 1938, Serial No. 229,154

3 Claims. (Cl. 74—498)

This invention relates to steering gears for vehicles and has for its object to provide an improved gear which will eliminate many objections of conventional gears while giving new advantages and which can be manufactured at a substantial saving in cost.

The main objections to conventional steering gears are that they wear unduly in straight ahead driving position for the apparent reason of insufficient bearing surfaces, they are unduly costly for the reason that high thrust loads are imposed in such manner as to necessitate expensive bearings and expensive casings, and that the worm gearing which they incorporate is of relatively low efficiency under high pressures.

An object of the present invention is to provide a reduction gearing of such type that a large number of teeth, of the order of twenty-five to thirty percent in number, will be in constant engagement, thus eliminating hammering and materially reducing wear.

Another object is to provide a type of reduction gearing for this purpose which will reduce sliding action of the teeth, further reducing wear and increasing the efficiency.

A still further object is to produce a gearing which permits high reductions, as may be desired, with very small gear sizes, thereby reducing the weight, the cost and the amount of space required for installation.

More specifically, it is the object to provide a steering gear comprising double internal gearing for a double planetary arrangement, the inside gears having different numbers of teeth and being integral with each other, this dual gear constituting a driving eccentric for rotating the outside gears to which the wheel steering knuckles respond.

A further object is to provide alternate forms of construction in one of which adjustment of one set of the planetary gears is provided and in the other of which wear is precluded to a substantially greater extent by an additionally improved bearing arrangement.

A further object is to provide a steering gear of the type described with means for adjusting the inside gears with respect to the outside gears, or means for adjusting either or both outside gears with respect to each other and respect to the inside gear.

Other objects and advantages will become hereafter more fully apparent as reference is had to the accompanying drawings wherein Figure 1 is a vertical section, Figures 2 and 3 are sections taken respectively on the lines 2—2 and 3—3 of Figure 1, Figure 4 is a section illustrating a modification, Figure 5 is a section illustrating a modified adjusting means, Figure 6 is a section taken on the line 6—6 of Figure 5, Figure 7 is a view illustrating a detail, and Figure 8 is a section illustrating modified journal bearings for the internal gear.

A fragment of a steering wheel column 1 is illustrated having a flange 2 secured to a supporting bracket 3 and the flange 4 of a gear housing 5 by bolts 6. Within the column 1, supported by bearings 7, is a hollow shaft 8 adapted to have a steering wheel mounted on the upper end thereof in the usual manner. The shaft 8 has an eccentric extension 9 projecting into the gear casing 5, and a pair of connected spur gears 10 and 11 are rotatably supported on the extension 9 by roller bearings 12.

Interposed between the two flanges 2 and 4 is an internal gear 13, co-axial with the shaft 8. The gear 13 is secured between the flanges by the bolts 6, and it will be noted that the openings 14 through which the bolts 6 are slightly over-size to provide a radial clearance of approximately .008 inch. This permits the ring gear 13 to be shifted to compensate for wear or shop errors, and to thereby eliminate back lash.

Mounted in the gear housing 5, co-axial with the shaft 8, is an internal gear 15 having a shaft extension 16 supported by roller bearings 17. The internal gear 15 meshes with the spur gear 11, and in order to compensate for wear or shop errors the holes 18 in the flange 4 are also made over-size whereby the housing 5 may be shifted adjustably to properly position the ring gear 15 with respect to the spur gear 11.

Mechanical means is provided for causing adjustment of the internal gears 13 and 15, and comprises, in the case of the internal gear 13, a bolt 6a having an eccentric 6b thereon. The eccentric 6b engages in a bore in the internal gear 13 and causes shifting of the latter upon rotation thereof. Similarly, in the case of the internal gear 15, a bolt 6c is provided with an eccentric 6d engaging in a bore in the flange 4. Rotation of the eccentric 6d causes shifting of the flange 4, the housing 5 and the internal gear 15 which is journalled in the housing 5.

Actually, the amount of adjustment movement required is comparatively small, and it will be understood that in the drawings the clearances 14 and eccentrics 6b and 6d have been exaggerated for purposes of illustration.

On the extremity of the shaft extension 16 is mounted a lever 19 which is adapted to be connected with the steering linkage of the steer wheels of a vehicle.

The two spur gears 10 and 11 are of different diameters, the gear 10 being of greater diameter than the gear 11. The internal gear 13, being stationary, comprises the reaction gear and causes rotation of both gears 10 and 11 relative to the eccentric 9, as the latter is moved through rotation of the shaft 8. Due to the fact that the gear 11, which meshes with the internal gear 15, rotates at the same time it moves with the eccentric, the motion imparted to the internal gear 15 by the gear 11 is at a slower rate than the rate of rotation of the shaft 8. By varying the gear proportions any desired reduction may be obtained through the gearing arrangement described.

In operation of the above described gearing arrangement the eccentric is subjected to very high loading and bending stresses and it is desirable, in some cases, to support the eccentric at both sides by anti-friction bearings. Such an arrangement is illustrated by way of modification in Figure 4 wherein the eccentric 9a is supported by the shaft bearings 7a at one side. The eccentric 9a has an extension 20, co-axial with the shaft 8a, and supported in bearings 21 which are mounted in a bore 22 in the internal gear 15a. The internal gear 15a, shaft 16a and bore 22 are co-axial with the shaft 8a.

In Figs. 5, 6 and 7, a steering column 30 has a flange 31 secured thereto, and the flange 32 of a gear housing 33 is secured to the flange 31 by bolts 34, one of which is shown in the drawings. Interposed between the two flanges 31 and 32 is an internal gear 35 in constant mesh with a spur gear 36. The spur gear 36 is rotatably mounted on the eccentric end 37 of a shaft 38, which extends through the column 30. Connected to the spur gear 36 is a smaller spur gear 39 which constantly meshes with the internal gear 40 in the gear housing 33. The internal gear 40 is connected to a second shaft 41.

The arrangement thus far described with reference to Figures 5, 6 and 7 is similar in construction and operation to that shown in Figure 1. It differs from the showing of Figure 1 in the means for relatively adjusting the gears 35, 36, 39 and 40. The adjustment means in this case comprises an eccentric 42 on the shaft 38, upon which is screwthreaded a sleeve 43. The inner surface of the sleeve 43 is cylindrical and is eccentric with respect to its outer surface, which is also cylindrical. The sleeve 43 is supported in a journal bearing 44, mounted in the end flange 31, and its outer cylindrical surface remains concentric with the bearing at all times.

If wear occurs, or if shop errors are to be compensated for, the sleeve 43 is rotated from the position shown, in either direction, through ninety degrees or a fraction of ninety degrees. Movement of the sleeve 43 shifts the axis of the shaft 38 radially relative to the column 30 and the housing 33, and after the desired adjustment movement is attained to eliminate excess clearance between the gears 35 and 36, and 39 and 40, the sleeve 43 is secured against rotation. To facilitate securing of the sleeve, it is slotted to provide a tongue formation 45, and the bearing 44, flange 31 and column 30 are slotted at 46 in order that a tool may be placed in contact with the tongue 45. The tool, for example, is a center punch, and after the desired adjustment is attained, it is struck with sufficient force to deform the tongue and eccentric 42, as illustrated at 47. The slots 46 are then covered by a band or bracket 48.

Fig. 8 illustrates a modified bearing arrangement in a construction which is non-adjustable. In this view, the column 50 has an end flange 51 secured to the flange 52 of a gear housing 53, with an internal gear 54 interposed between the two flanges. A shaft 55 is rotatably supported by bearings 56 in the end flange 51, and by bearings 57 in a second shaft 58. The shaft 55 has an eccentric 59 with a spur gear 60 rotatable thereon and meshing with the internal gear 54. Connected to the spur gear 60 is a smaller spur gear 61 which meshes with an internal gear 62 which is integral with the shaft 58. A bearing 63, supported in the housing 53 contacts the outer periphery of the internal gear 62 and supports the internal gear 62, the shaft 58, and the bearings 57 which support the shaft 55. This arrangement is characterized by its extreme compactness.

It will be observed from the foregoing that three methods of adjusting the gearing have been provided: first, radial movement of the outer or ring gear 13 with respect to the internal gears 10 and 11; secondly, radial movement of the outer ring gear 15 with respect to the internal gears 10 and 11, with or without accompanying movement of the ring gear 13; and thirdly, radial movement of the internal gears 10 and 11 with respect to the ring gears 13 and 15. In the event of movement of the ring gears, it will be observed that if clearance is taken up on one side, that is, through any given arc, it will increase the clearance to a corresponding extent through a similar arc diametrically opposite thereto. In order that such an adjustment be of advantage, it should be made while the wheels of the vehicle are in "straight ahead" position, the clearances then being decreased to a minimum and hence transferred to arc corresponding to the "hard over" positions of the wheels where it is not considered detrimental.

The third type of adjustment, which involves shifting the inside gearing, will not entail the transfer of clearances for the reason that when the eccentricity of the bearings 31 and 44 is added to the eccentricity of the offset end 42 of the stem 38 the effect will be to increase the radius of rotation of the gears 10 and 11. If clearance is obviated through any arc, it will be obviated through all arcs.

Although a specific embodiment of the invention has been illustrated and described it will be understood that the construction may be changed without departing from the spirit of the invention as defined in the following claims, and such changes are contemplated.

What I claim is:

1. A steering gear comprising a housing, an actuating shaft, an actuated shaft and means connecting said shafts all located in said housing, said connecting means comprising a rotatable pinion eccentrically mounted on said actuating shaft, gear means including one gear anchored in said housing restricting free rotation of said pinion, and speed reducing means connecting said pinion and said actuated shaft, the gear anchored in said housing being radially adjustable with respect to its mating gear to compensate for imperfect meshing of its teeth.

2. In combination, a steering wheel column having a shaft rotatable therein, a housing secured to said column and having internal gear teeth, said housing being radially adjustable with respect to the steering column, a eccentric in said housing connected to said shaft, a pair of connected spur gears rotatable on said eccentric, one of said spur gears meshing with said gear teeth, a second shaft rotatable in said housing, and an internal gear meshing with the other spur gear and connected to the second shaft.

3. In combination, a steering wheel column having a flanged end, a gear housing having a flanged end secured to said end of the column, a shaft rotatable in the column and having an eccentric extending into said housing, a pair of connected spur gears rotatable on said eccentric, a shaft journalled in said housing having an internal gear meshing with one of said spur gears, an internal gear between the flanged ends of said column and housing and meshing with the other of said spur gears, and bolts extending through holes in said internal gear and engaging and securing said flanged ends together with the internal gear interposed therebetween, the bolt holes in the ring gear and the housing being larger than the bolts whereby both internal gears are radially adjustable.

KARL K. PROBST.